United States Patent [19]

Lynn

[11] 4,428,233
[45] Jan. 31, 1984

[54] GAUGE FOR MEASURING DEPTH OF FLOWING FLUID

[76] Inventor: Lewis G. Lynn, 65 Hillhurst La., Rochester, N.Y. 14617

[21] Appl. No.: 91,941

[22] Filed: Nov. 7, 1979

[51] Int. Cl.³ .............................................. G01F 23/08
[52] U.S. Cl. ......................................... 73/315; 73/319
[58] Field of Search ................. 73/315, 319, 323, 305, 73/1 H; 116/228

[56] References Cited

U.S. PATENT DOCUMENTS 1,056,178  3/1913  Humphrey ........................... 116/228
1,495,292  5/1924  Fields .................................... 73/315
2,266,391 12/1941  Collet .................................... 73/319

FOREIGN PATENT DOCUMENTS 1119319  6/1956  France .................................... 73/323

Primary Examiner—Charles Frankfort
Assistant Examiner—Denis E. Corr
Attorney, Agent, or Firm—Shlesinger, Fitzsimmons & Shlesinger

[57] ABSTRACT

This guage is adapted to measure the depth of fluid flowing past a flume or weir in a generally horizontally disposed conduit. It comprises a transparent tube or stilling well which contains a float, and which is adjustably secured by a pair of clamps to an elongate supporting rod. The float can be clamped against movement in the well by a hose, which extends downwardly in the bore of the well, and which is sealed at its lower end. The hose is connected at its upper end to a manually-operable vacuum device which can be manipulated either to collapse or expand the hose. In use the hose is collapsed and the lower end of the supporting rod is inserted downwardly into a conduit to support the lower end of the well a predetermined distance above the bottom of the conduit, and in advance of the associated weir or flume. The flowing fluid causes the float to rise in the well to a height proportional to the depth of the flowing fluid, after which the vacuum device is operated to expand the hose causing it to engage and clamp the float against further movement in the well. Thereafter the support is removed from the conduit and the now-clamped float is read against a graduated scale which is inscribed on the transparent well, and which is calibrated to indicate numerically the depth of the fluid in the channel.

10 Claims, 5 Drawing Figures

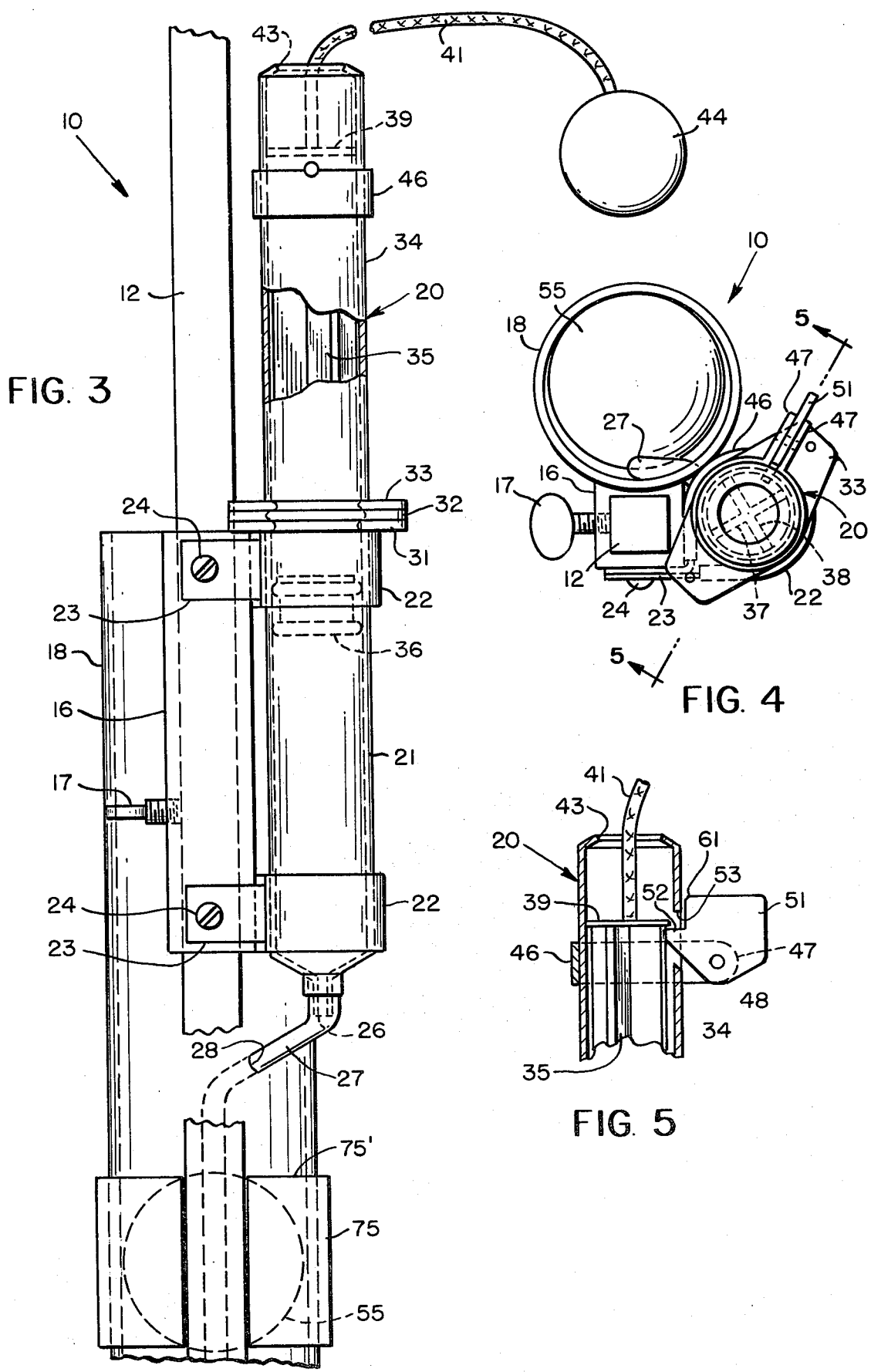

GAUGE FOR MEASURING DEPTH OF FLOWING FLUID

This invention relates to gauges, and more particularly to a hand-held gauge or instrument for measuring the depth of fluid flowing in a channel, such as a sewer pipe or the like.

It is well known by those skilled in the art that the rate of flow of fluid in a pipe or channel can be determined by reference to existing charts, if the depth of the flowing fluid can be determined under certain conditions of flow. These necessary conditions may be established by inserting a flume or weir in the pipe or channel in the vicinity of where the depth measurement is to be taken. Then by determining the depth of the flowing fluid in front of the weir or flume, the rate of flow of the fluid may be determined by reference to a standard chart where flow rates are listed in terms of the depth of the flowing fluid.

Heretofore apparatus used for determining the depth of flowing fluid under circumstances of the type described has been very expensive, and has required the services of a skilled technician. Moreover, turbulence created in the flowing fluid during the measurement of its depth has tended to provide inaccurate results.

It is an object of this invention, therefore, to provide a novel and inexpensive depth gauge for measuring the depth of flowing fluid in channels of the type described, and which can be used to provide extremely accurate results even when operated by a relatively unskilled technician.

It is a further object of this invention to provide a relatively small, compact gauge of the type described which is fully manually operable and requires no electrical power for its operation.

A further object of this invention is to provide a novel gauge of the type described which utilizes relatively few moving parts, and which can be readily manipulated to measure the flow in channels positioned well below ground level, as well as open channels located adjacent the earth's surface.

Still another object of this invention is to provide a portable, versatile gauge of the type described which is readily adjustable to make it suitable for use in connection with any one of a plurality of different types of conventional weirs or flumes.

Other objects of the invention will be apparent hereinafter from the specification and from the recital of the appended claims, particularly when read in conjunction with the accompanying drawings.

In the drawings:

FIG. 3 is a fragmentary elevational view similar to FIG. 2, but showing only a portion of the gauge, and on a much larger scale;

FIG. 4 is a plan view of this gauge on the same scale as FIG. 3; and

FIG. 5 is a fragmentary sectional view taken along the line 5—5 in FIG. 4 looking in the direction of the arrows.

Figure 1:
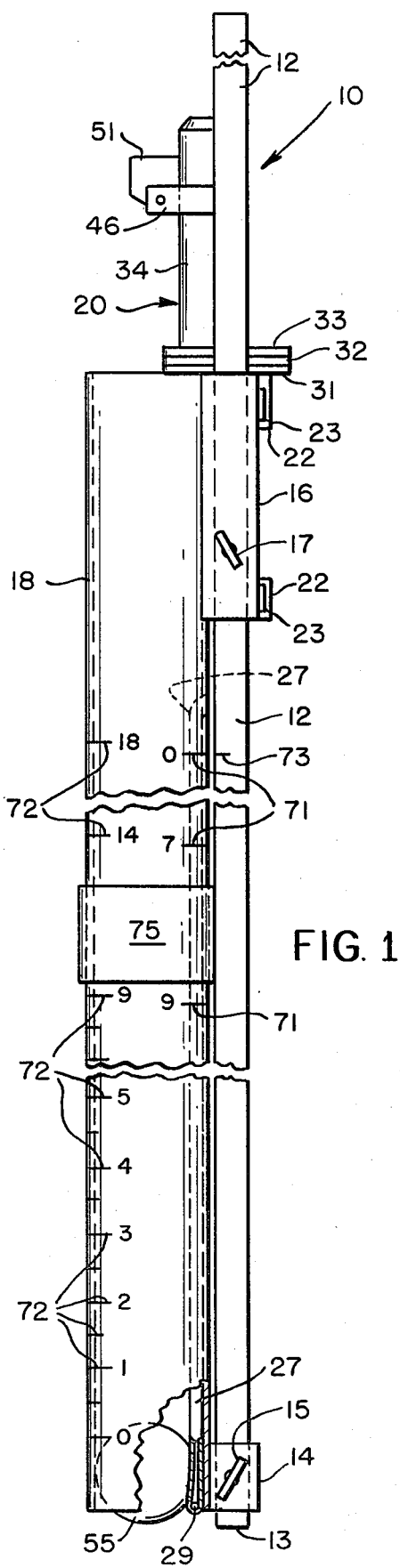
FIG. 1 is a fragmentary front elevational view of a flow gauge made according to one embodiment of this invention, portions of the gauge being broken away and shown in section.

Referring now to the drawings by numerals of reference, 10 denotes generally a flow gauge, comprising an elongate support rod 12, which is rectangular in cross section, and which has a plane surface 13 on its lower end. Mounted by a pair of spaced brackets 14 and 16 on rod 12 for adjustment longitudinally thereof is an elongate tube, or stilling well 18. The brackets 14 and 16 are rectangular tubular members and have thumb screws 15 and 17, respectively, threaded through the sides thereof for frictional engagement at their inner ends with one side of the rod 12, thereby to permit adjustment of the brackets longitudinally of the rod. Opposite ends of the stilling well 18 are fixed to one side each of the brackets 14 and 16 to be moveable therewith longitudinally of rod 12 into different, vertically adjusted positions thereon. The well 18 extends parallel to rod 12, so that when rod 12 is positioned vertically, the axis of the stilling well 18 will also be disposed vertically.

Mounted on the upper bracket 16 for movement therewith on rod 12 is a vacuum cylinder, which is denoted generally by the numeral 20. Cylinder 20 comprises a lower, tubular section 21, which is secured adjacent opposite ends thereof in a pair of ring clamps 22. Each of clamps 22 has a radial projection 23, which is fastened by a screw 24 to one side of bracket 16. The lower end of section 21 has formed thereon a reduced-diameter nipple 26, which is secured to one end of a flexible clamping tube or hose 27, which may be made from silicone rubber, or the like. The tube 27 extends through an opening 28 (FIGS. 2 and 3) in the annular wall of the stilling well 18, and downwardly to a point immediately adjacent the bottom of the well where its lower end is sealed by a ball plug 29 (FIG. 1) for a purpose noted hereinafter.

The upper open end of the cylinder section 21 has an integral flange 31 (FIGS. 3 and 4), which supports thereon a conventional washer 32, and which is fastened to a similarly shaped flange 33 that is formed on the lower end of the upper cylinder section 34. Section 34, which is tubular and generally similar in configuration to the registering, lower section 21, forms therewith an elongate bore in which is mounted a reciprocable plunger 35. On its lower end plunger 35 has a cylindrical piston head 36, which has sliding, sealing engagement with the inner bore wall of the lower cylinder section 21. Above the piston head 36 the plunger 35 comprises a pair of elongate, intersecting plate members 37 and 38 (FIG. 4), the outer, longitudinally extending edges of which have sliding engagement with the bore wall of cylinder section 34.

At its upper end the plunger 35 has secured thereon a circular cap member 39 (FIGS. 3 and 5), which is fixed to one end of a flexible cord 41, the opposite end of which extends out of an opening 43 in the upper end of section 34. A ring or spherical operating member 44 is fastened to the outer end of cord 41 externally of cylinder 20 for operating plunger 35 as noted hereinafter.

Fastened around section 34 adjacent its upper end is a ring clamp 46, opposite ends of which are bent radially outwardly to be disposed in spaced, registering relation, as shown at 47 in FIG. 4. Pivoted intermediate its ends by a pin 48 between the confronting ends 47 of the ring 46 is a latching lever 51. At one side thereof lever 51 has a rigid nose portion 52 which is adapted to project through an opening 53 in the tubular section 34, and into a latching position beneath the cap 39 on the plunger 35, when the plunger and latching lever are disposed in the positions shown in FIG. 5. In this position the nose 52 on lever 51 prevents the plunger 39 from descending downwardly in cylinder 20, as noted hereinafter.

Figure 2:
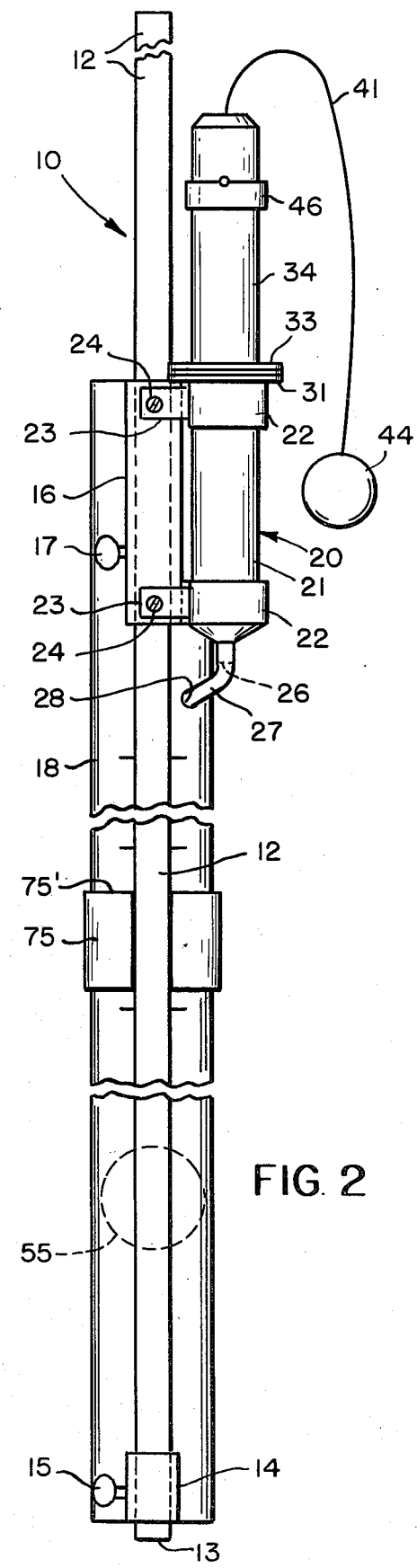
FIG. 2 is a fragmentary side elevational view of this gauge.

Referring to FIG. 1, numeral 55 denotes a rubber ball or float, which is mounted to float in the bore of the tube or still well 18 in a manner noted hereinafter. For this reason the float 55 has a diameter smaller than the inside diameter of the well. However, the tube 27, which is adhered to the inside of well 18, can be operated selectively to clamp the float 55 against movement in the bore of well 18. For example, when tube 27 is in its normal, or inflated condition, its outer peripheral surface (at some point) has frictional engagement with ball float 55 to prevent any movement thereof in well 18. However, whenever the plunger 35 in cylinder 20 is operated as noted hereinafter to withdraw air from tube 27 the latter will collapse or contract radially along its length, thereby being moved out of engagement with float 55 to permit movement of the latter in the bore of well 18.

The ball float 55 is prevented from falling completely out of the lower end of the well 18 by means of the plug 29 in the lower end of tube 27. This plug has a diameter larger than the inside diameter of tube 27, so that the lower end of the tube is stretched radially outwardly to be engageable with the ball float 55, whenever the latter drops to the lower end of the well 18 (FIG. 1), thereby preventing the ball from falling completely out of the lower end of the well, but at the same time permitting the float to rise upwardly in the well, assuming that hose 27 is collapsed.

With the lower end of tube 27 sealed by the plug 29, the tube can be collapsed by manipulating the vacuum device 20 to withdraw air from the upper end of the tube.

For example, assuming that the tube 27 is in its expanded condition, the plunger 35 will be in its lowermost position (not illustrated) wherein its piston head 36 will be positioned in the lower end of the cylinder section 21, or approximately in registry with the lower clamp 22. Then, in order to collapse tube 27, the cord 41 is drawn manually by its handle 44 to pull the plunger 35 upwardly in cylinder 20 to its uppermost position as shown in FIGS. 3 and 5. At this time the latch 51 is pivoted manually, and counter-clockwise in FIG. 5, into its latching position wherein its nose 52 passes beneath the plunger cap 39. In this position the vacuum present in the lower cylinder section 21, together with the weight of the plunger itself, tends to cause the plunger 35 to shift downwardly forcing its cap 39 against the nose 52 on the latching lever. At this stage the upper left hand corner 61 of the lever 51 rests against the outside of the cylinder section 34, thereby preventing any further counter-clockwise rotation of lever 51, and operatively maintaining the plunger 35 in its uppermost position. At this stage the ball 55, which would be in its lowermost position as shown in FIG. 1, would be free to roll or float upwardly in the well 18. (Note that in FIG. 1 the tube 27 is shown in its inflated or clamping condition).

Inscribed on the transparent well 18 at diametrally opposite sides thereof are two different scales, one of which comprises a plurality of spaced graduations 71 and the other comprising spaced graduations 72. The scale represented by graduations 71 is adapted to be read against a scribe mark 73 (FIG. 1), which is formed on one side of the support rod 12 intermediate its ends for use in setting the "zero" position of the gauge as noted hereinafter. Graduations 71 read downwardly on the well 18, with the uppermost graduation being denoted as "zero", and successive graduations, as seen when reading downwardly on the well 18, being denoted by the numerals 1, 2, 3, etc.

The graduations 72 of the other scale are for indicating the depth of a flowing fluid, and are read from the lower end upwardly on the well 18, commencing from a "zero" position adjacent the lower end of the well, and progressing upwardly with certain successive, equi-spaced graduations being denoted by the numerals 1, 2, 3, etc.

When the gauge 10 is in use, the lower end 13 of the support rod 12 is adapted to be positioned in a channel through which fluid is flowing, and in advance or in front of a weir or flume which may be of any conventional variety, for example "Parshall" flume, or a "Palmer-Bowles" or "Leopold-Lagco" flume. The basic height of the stilling well 18 must therefore be preset or zeroed to conform to the particular type of flume with which the instrument is being used. For example, when using the Parshall flume, the thumb screws 15 and 17 are loosened and the associated brackets are adjusted until the zero designation of the first scale (graduations 71) registers with the scribe mark 73 on the rod 18. This is the position of the well as illustrated in FIG. 1. The thumb screws 15 and 17 are then tightened to secure the well in this zero position. The reason for this is that, when using a Parshall flume, there is no water at the measurement location when there is zero flow in the associated channel.

However, when a Palmer-Bowles or Leopold-Lagco device is employed, this step or adjustment of the zero position of the well 18 is determined by dividing the diameter of the pipe or conduit (in which a measurement is to be made) by six. The numerical answer is then placed in registry with the scribe mark 73 on rod 12. In the embodiment illustrated the scale denoted by graduations 71 was calibrated in inches, so that the answer which is received by dividing the pipe diameter by six, should be converted to inches before the zero position of the well 18 is adjusted.

After the well 18 has been adjusted into its zero position, the plunger 35 is elevated by the cord 41 into its latched position (FIG. 5), thereby collapsing tube 27. The instrument is then lowered into its measuring position with the bottom 13 of the rod 12 seated on the bottom of the channel or pipe at its so-called invert, and in advance of the flume or weir if one is being used. The flowing water then enters the lower end of the well 18 and causes the ball float 55 to rise to a level equivalent to that of the level of the fluid that is flowing in the channel. During this operation the rod 12 should be maintained as vertically as possible, and if necessary may be rotated back and forth slightly to make sure that its lower end 13 is properly engaged with the channel bottom. Thereafter the cord 41 is pulled once again slightly upwardly, thereby releasing the latch 51, which, because of the manner in which it is pivoted on pin 48, is caused by its own weight to pivot clockwise from its latching position in FIG. 5, and into an unlatched position in which its nose 52 is pivoted out of the opening 53 in tubular member 34, thereby allowing the plunger 35 to descend downwardly in cylinder 20, and to reinflate tube 27. As soon as this occurs the tube 27 expands and locks the ball float 55 against further movement in well 18, whereby the float 55 provides (once it is clamped against movement in the well) a fixed determination of the height of the flowing water at the instant it was measured.

The gauge is then withdrawn from the channel and a plastic ring or float locating slide 75, which is mounted for sliding movement on the outer periphery of well 18 coaxially thereof, is adjusted manually along the well until its upper edge 75' registers with the upper edge of the ball float 55, as shown for example in FIG. 3. The edge 75' of the slide 75 is then read against the scale formed by the graduations 72, thereby providing in inches, feet or centimeters, depending on the manner in which the scale is calibrated, a direct reading of the depth of the flowing fluid at the measuring point in the conduit. The rate of flow is then determined, in known manner, by referring this depth measurement to the standard table which is related to the particular flow channel or weir being used. The table will then give the flow rate of the fluid in the channel. The scale represented by graduations 72 is calibrated for the particular diameter of the ball float 55 which is used in the well, and compensates also for its displacement in water.

In view of the foregoing, it will be apparent that the instant invention provides a relatively simple and inexpensive means for determining the depth of flowing fluid in a channel, thus allowing rapid determination of the rate of flow of the fluid in the channel. The advantage of the instrument is that it can be used selectively in connection with any one of a variety of conventional flumes or weirs, or even in an open channel not having a weir or flume, where the slope, roughness and configuration of the channel are known. Moreover it can be operated even by the unskilled, and can be used by an operator standing directly beside an open or flowing channel; or, alternatively, an extension (not illustrated) of any conventional variety can be attached to the upper end of rod 12 so that the instrument can be lowered downwardly into a channel or sewer located beneath the earth's surface, whereby the operator need not climb down into the sewer to make the measurement.

Moreover, by employing a stilling well 18, it is possible to eliminate or minimize any undesireable effects which might otherwise occur as the result of surface roughness and wave disturbance formed on the surface of the water or fluid being measured. This disturbance usually accompanies any device which is placed into a flowing stream. By use of the scale on one side of the well 18 it is possible readily to adjust the well to suit the characteristics of the associated flume or weir; and, it is likewise a simple matter to utilize the other scale to determine the height of the flowing fluid, merely by shifting the float locating slide 75 into registry with the upper end of the float 55, and then to read this edge of the slide against the graduations 72.

While in the embodiment illustrated only a single scale for graduations 72 is illustrated, it will be apparent that several such scales may be marked on the well 18, if desired, one for example, calibrated in inches, another in centimeters, and even a third in feet, and tenths thereof.

Periodically it may be advisable to remove the clamping tube 27 from the nipple 26 on the lower end of cylinder 20, and to urge the plunger 35 axially downwardly to its lowermost position in the cylinder, after which the upper end of the tube 27 is reattached to nipple 26. This operation removes any excess air which may have leaked into the vacuum cylinder 20 beneath the piston head 36, and might be necessary once in a while if the plunger 35 fails to drop downwardly in the cylinder whenever cord 41 is pulled to release the latch 51.

While this invention has been described in detail in connection with only one embodiment thereof, it will be apparent to one skilled in the art that it is capable of still further modification, and that this application is intended to cover any such modifications as may fall within the scope of one skilled in the art or the appended claims.

Having thus described my invention, what I claim is:

1. A portable gauge for measuring the depth of fluid flowing in an open conduit of known configuration, or past a flume or weir in a generally horizontally disposed conduit, comprising
   a hand-held, portable support disposed to be inserted manually into a conduit with its lower end releasably resting on the bottom surface of said conduit,
   a transparent, tubular well open at each end and having a float movable in its bore,
   means for adjustably mounting said well on said support for vertical adjustment thereon relative to said lower end of said support, said well disposed to be held vertically by said support with its lower, open end positioned a predetermined distance above the bottom of said conduit to permit fluid from the conduit to enter the well and elevate said float,
   a graduated scale on said well indicating the height of the float above said lower end of the well, when the float is floating on the fluid which enters, the lower end of said well, and calibrated to provide a direct reading of the depth of the fluid flowing in said conduit, and
   clamping means extending into said well and operable, when said float is floating in said well releasably to clamp said float against further movement in the well, whereby after the support is withdrawn from the conduit the clamped float may be read against the scale on said well.

2. A gauge as defined in claim 1, wherein
   a second graduated scale is formed on one of two confronting surfaces on said well and on said support, respectively, and
   a reference mark is formed on the other of said confronting surfaces to be readable against said second graduated scale during adjustment of said well on said support to indicate the relative distance of said lower end of the well above said lower end of the support.

3. A gauge as defined in claim 1, wherein said clamping means comprises
   an expansible clamping member extending longitudinally in the bore in said well and movable between an expanded position in which it operatively clamps said float against movement in said well, and a collapsed position in which it releases said float for movement in said well, and
   manually operable means on said support for selectively moving said clamping member into its expanded and collapsed positions, respectively.

4. A gauge as defined in claim 3, including latching means operable upon movement of said clamping member into its expanded position releasably to hold said member in said expanded position.

5. A gauge for measuring the depth of fluid flowing in an open conduit of known configuration, or past a flume or weir in a generally horizontally disposed conduit, comprising a support disposed to be inserted into a conduit with its lower end resting on the bottom surface of said conduit, a transparent, tubular well having a float movable in its bore, means mounting said well on said support to be held thereby vertically with its lower, open end positioned to permit fluid from the conduit to enter the well and elevate said float, a graduated scale on said well indicating the height of the float above said lower end of the well, when the float is floating on the fluid which enters the lower end of said well, and calibrated to provide a direct reading of the depth of the fluid flowing in said conduit, clamping means operable, when said float is floating in said well, to clamp said float against further movement in the well, whereby when the support is withdrawn from the conduit the clamped float may be read against the scale on said well, said mounting means being adjustable to position said well selectively on said support with the lower end of the well positioned a predetermined distance above said lower end of the support, a second graduated scale formed on one of two confronting surfaces on said well and on said support, respectively, and a reference mark formed on the other of said confronting surfaces to be readable against said second graduated scale during adjustment of said well on said support to indicate the relative distance of said lower end of the well above said lower end of the support, said clamping means comprising a clamping member extending longitudinally in the bore in said well and movable between a first position in which it operatively clamps said float against movement in said well, and a second position in which it releases said float for movement in said well, and manually operable means on said support for selectively moving said clamping member into its first and second positions, respectively, said clamping member comprising an expansible element extending along the inside of the bore in said well, and said manually operable means for moving said clamping member comprising fluid pressure operated means operatively connected at one end to said expansible member and including a piston movable in a cylinder in one direction to cause said expansible member to expand into the bore in said well to impede movement of the float in said well, and movable in the opposite direction to cause said expansible member to contract in the bore in said well thereby not to impede movement of the float in said well.

6. A float as defined in claim 5, wherein said expansible member comprises a hose connected at one end to said one end of said fluid pressure operated means, and extending at its opposite end through an opening in the side of said well, and downwardly in said well toward the lower end thereof, said opposite end of said hose being sealed to enable the hose to be selectively expanded and contracted by said fluid pressure operated means.

7. A portable gauge for measuring the depth of liquid flowing in a conduit, comprising a transparent tube having a float movable in the bore, means for removably supporting said tube vertically in a conduit through which fluid is flowing in a generally horizontal direction, and with the lower end of the tube positioned a predetermined distance above a reference surface in said conduit to allow fluid to enter the tube to cause the float to rise in the tube in proportion to the depth of the flowing fluid, manually operable means on said tube for releasably clamping the floating float against movement in said tube before removing the tube from said conduit, and a plurality of graduations on said tube spaced from each other longitudinally of the tube to be readable against the clamped float, and calibrated to indicate the depth of the fluid flowing in said conduit, said supporting means comprising an elongate hand-held rod adopted to be inserted manually into said conduit so as to have its lower end rested on said reference surface in said conduit, and to be withdrawn from the conduit to permit said clamped float to be read against said graduations, and at least one clamp for adjustably mounting said tube on said rod to extend parallel thereto, and for adjustment longitudinally of the rod to position its lower end a predetermined, selected distance from said lower end of said rod.

8. A gauge for measuring the depth of a liquid flowing in a conduit, comprising a transparent tube having a float movable in its bore, means for removably supporting said tube vertically in a conduit through which fluid is flowing in a generally horizontal direction, and with the lower end of the tube positioned a predetermined distance above a reference surface in said conduit to allow fluid to enter the tube to cause the float to rise in the tube in proportion to the depth of the flowing fluid, manually operable means on said tube for releasably clamping the floating float against movement in said tube before removing the tube from said conduit, and a plurality of graduations on said tube spaced from each other longitudinally of the tube to be readable against the clamped float, and calibrated to indicate the depth of the fluid flowing in said conduit, said clamping means comprising a flexible hose extending axially through the bore in said tube, and means for selectively inflating and deflating said hose, whereby when it is inflated the hose expands into engagement with said float to clamp it against movement in said tube, and when deflated the hose contracts to disengage said float to permit its movement in said tube.

9. A gauge as defined in claim 4, wherein said clamping means further comprises, a cylinder connected at one end to one end of said hose, means including a piston reciprocable in said cylinder between a first position in which it forces fluid into said hose to effect expansion thereof, and a second position in which it withdraws fluid from said hose to effect contraction thereof, and means for releasably latching said piston in one of its first and second positions, respectively.

10. A gauge as defined in claim 11, wherein a plug is sealingly secured in the opposite end of said hose adjacent the lower end of said tube, and has a diameter larger than the internal diameter of said hose, whereby the hose is stretched radially in the vicinity of said plug thereby to be engageable with and to prevent said float from falling out of the lower end of said tube when the hose is collapsed.

* * * * *